US012769944B2

(12) United States Patent
Weller et al.

(10) Patent No.: US 12,769,944 B2
(45) Date of Patent: Oct. 20, 2026

(54) TEMPORAL MODEL TIME-BASED ANCHOR DETERMINATION

(71) Applicant: Astrata, Inc., Pittsburgh, PA (US)

(72) Inventors: Melissa Weller, Pittsburgh, PA (US); Wei Wei, Pittsburgh, PA (US); Rebecca Jacobson, Pittsburgh, PA (US)

(73) Assignee: Astrata, Inc., Pittsburgh, PA (US)

( * ) Notice: Subject to any disclaimer, the term of this patent is extended or adjusted under 35 U.S.C. 154(b) by 278 days.

(21) Appl. No.: 18/398,881

(22) Filed: Dec. 28, 2023

(65) Prior Publication Data

US 2024/0220724 A1 Jul. 4, 2024

Related U.S. Application Data

(60) Provisional application No. 63/437,042, filed on Jan. 4, 2023.

(51) Int. Cl.
*G06F 40/284* (2020.01)
*G06F 40/30* (2020.01)

(52) U.S. Cl.
CPC ............ *G06F 40/284* (2020.01); *G06F 40/30* (2020.01)

(58) Field of Classification Search
CPC ............................... G06F 40/284; G06F 40/30
See application file for complete search history.

(56) References Cited

U.S. PATENT DOCUMENTS

| | | | | |
|---|---|---|---|---|
| 2016/0188143 | A1* | 6/2016 | Kohlmeier | G06F 3/0482 715/753 |
| 2020/0322361 | A1* | 10/2020 | Ravindra | G06F 40/279 |
| 2020/0396087 | A1* | 12/2020 | Zabetian | H04L 63/126 |
| 2021/0118444 | A1* | 4/2021 | Cohen | G06N 20/00 |
| 2022/0198254 | A1* | 6/2022 | Dalli | G06N 3/094 |
| 2022/0317979 | A1* | 10/2022 | Araujo Soares | G06F 16/9024 |

(Continued)

OTHER PUBLICATIONS

American Medical Association, "Quality ID #343: Screening Colonoscopy Adenoma Detection Rate—National Quality Strategy Domain: Effective Clinical Care," Version 2.0, Dec. 11, 2017, 8 pages.

(Continued)

*Primary Examiner* — Michael N Opsasnick
(74) *Attorney, Agent, or Firm* — Fish & Richardson P.C.

(57) ABSTRACT

Methods, systems, and apparatus, including computer programs encoded on computer storage media, for temporal modeling. One of the methods includes for each of one or more candidate anchors included in a plurality of tokens for a document, the plurality of tokens including a) at least one temporal modifier with a span, and b) at least one anchor i) for the temporal modifier and ii) that has a duration at least partially included in the span of the temporal modifier: accessing a representation of a context for the corresponding candidate anchor in the document; determining an attention of the corresponding token on the corresponding candidate anchor; and determining whether a duration of the corresponding candidate anchor is likely included in the span of the temporal modifier; and storing, in memory, data for the document that indicates that the corresponding candidate anchor is an anchor for the temporal modifier.

19 Claims, 3 Drawing Sheets

(56) References Cited

U.S. PATENT DOCUMENTS

| | | | | |
|---|---|---|---|---|
| 2023/0047988 | A1 * | 2/2023 | Matsuoka | G06Q 30/0271 |
| 2024/0220724 | A1 * | 7/2024 | Weller | G06F 40/284 |

OTHER PUBLICATIONS

Analyticsvidhya.com [online], "Fundamentals of Deep Learning—Activation Functions and When to Use Them?," Jan. 2020, retrieved on Feb. 6, 2024, retrieved from URL<https://www.analyticsvidhya.com/blog/2020/01/fundamentals-deep-learning-activation-functions-when-to-use-them/>, 20 pages.

Bahdanau et al., "Neural Machine Translation by Jointly Learning to Align and Translate," CoRR, submitted on May 19, 2016, arXiv:1409.0473v7, 15 pages.

Blulab.chpc.utah.edu [online], "ConText/NegEx," available on or before Mar. 29, 2019 via Internet Archive Wayback Machine URL<https://web.archive.org/web/20190329085045/http://blulab.chpc.utah.edu/content/contextnegex>, retrieved on Feb. 5, 2024, retrieved from URL<https://web.archive.org/web/20190329085045/http://blulab.chpc.utah.edu/content/contextnegex>, 3 pages.

Clamp.uth.edu [online], "CLAMP: Clinical Language Annotation, Modeling, and Processing Toolkit," available on or before Apr. 23, 2021 via Internet Archive: Wayback Machine URL<https://web.archive.org/web/20210423230014/http://clamp.uth.edu/index.php>, retrieved on Feb. 5, 2024, retrieved from URL<https://clamp.uth.edu/index.php>, 9 pages.

Dilgach et al., "Neural Temporal Relation Extraction," Proceedings of the 15th Conference of the European Chapter of the Association for Computational Linguistics, Apr. 2017, 2:746-751.

Harkema et al., "ConText: An algorithm for determining negation, experiencer, and temporal status from clinical reports," Journal of Biomedical Informatics, Oct. 2009, 42(5):839-851.

Hochreiter et al., "Long Short-term Memory," Neural Computation, 1997, 9(8):1735-1780.

Lin et al., "A BERT-based Universal Model for Both Within- and Cross-sentence Clinical Temporal Relation Extraction," Proceedings of the 2nd Clinical Natural Language Processing Workshop, Jun. 2019, 65-71.

Luan et al., "Multi-Task Identification of Entities, Relations, and Coreference for Scientific Knowledge Graph Construction," CoRR, submitted on Aug. 29, 2018, arXiv:1808.09602v1, 14 pages.

Luong et al., "Effective Approaches to Attention-based Neural Machine Translation," CoRR, submitted on Sep. 20, 2015, arXiv:1508.04025v5, 11 pages.

Pressbooks.pub [online], "Essential of Linguistics: Chapter 8: Forming Sentences," available on or before Oct. 31, 2022 via Internet Archive: Wayback Machine URL<https://web.archive.org/web/20221031211309/https://pressbooks.pub/essentialsoflinguistics/chapter/8-5-sentences-are-phrases/>, retrieved on Aug. 29, 2023, retrieved from URL<https://pressbooks.pub/essentialsoflinguistics/chapter/8-5-sentences-are-phrases/>, 6 pages.

Quirk et al., "Distant Supervision for Relation Extraction beyond the Sentence Boundary," Proceedings of the 15th Conference of the European Chapter of the Association for Computational Linguistics, Apr. 2017, 1:1171-1182.

Vaswani et al., "Attention Is All You Need," Advances in Neural Information. Processing Systems, Dec. 2017, vol. 30, 11 pages.

VictorZhou.com [online], "A Simple Explanation of the Softmax Function," Dec. 26, 2019, retrieved on Nov. 30, 2023, retrieved from URL<https://victorzhou.com/blog/softmax/>, 7 pages.

Wikipedia.org [online], "F-score," Aug. 22, 2023, retrieved on Aug. 29, 2023, retrieved from URL<https://en.wikipedia.org/w/index.php?title-F-score&oldid=1171586319>, 7 pages.

Wikipedia.org [online], "GloVe," Mar. 11, 2022, retrieved on Oct. 10, 2023, retrieved from URL<https://en.wikipedia.org/w/index.php?title=GloVe&oldid=1076520592>, 2 pages.

Wikipedia.org [online], "Precision and recall," Jul. 5, 2023, retrieved on Aug. 29, 2023, retrieved from URL<https://en.wikipedia.org/w/index.php?title-Precision_and_recall&oldid=11636 55774>, 10 pages.

Zhou et al., "Attention-Based Bidirectional Long Short-Term Memory Networks for Relation Classification," Proceedings of the 54th Annual Meeting of the Association for Computational Linguistics, Aug. 2016, 207-212.

* cited by examiner

TEMPORAL MODEL TIME-BASED ANCHOR DETERMINATION

CROSS-REFERENCE TO RELATED APPLICATION

This application claims the benefit of U.S. Provisional Application No. 63/437,042, filed Jan. 4, 2023, the contents of which are incorporated by reference herein.

BACKGROUND

Natural language processing ("NLP") systems can process documents to detect relationships between words in a single document. For instance, an NLP system can process a document to determine contextual nuances of the language included in the document when such nuances are not explicitly included in the document or the document's metadata.

SUMMARY

In general, one innovative aspect of the subject matter described in this specification can be embodied in methods that include the actions of for each of one or more candidate anchors included in a plurality of tokens for a document, the plurality of tokens including a) at least one temporal modifier with a span, and b) at least one anchor i) for the temporal modifier and ii) that has a duration at least partially included in the span of the temporal modifier: accessing a representation of a context for the corresponding candidate anchor in the document; determining, for each of two or more tokens included in the context for the corresponding candidate anchor and using the representation of the corresponding candidate anchor, an attention of the corresponding token on the corresponding candidate anchor; and determining, using the representation for the candidate anchor and the attention of the tokens on the corresponding candidate anchor, whether a duration of the corresponding candidate anchor is likely included in the span of the temporal modifier; and in response to determining, for at least one candidate anchor from the one or more candidate anchors, that the duration of the corresponding candidate anchor is likely included in the span of the temporal modifier, storing, in memory, data for the document that indicates that the corresponding candidate anchor is an anchor for the temporal modifier.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. The method can include converting, for each of two or more text elements in the document, the corresponding text element to a corresponding token from the plurality of tokens.

In some implementations, the method can include converting, for at least one of the one or more candidate anchors, the corresponding candidate anchor to an embedding representation. Determining the attention of the corresponding token on the corresponding candidate anchor can use the embedding representation of the corresponding candidate anchor.

In some implementations, the method can include receiving, from another system, second data that includes the context for the corresponding candidate anchor in the document; and providing, to the other system, the data for the document that indicates that the corresponding candidate anchor is an anchor for the temporal modifier.

In some implementations, the context can include, for the corresponding candidate anchor, at most a predetermined quantity of tokens surrounding the corresponding candidate anchor in the document.

In some implementations, the context can include, for the corresponding candidate anchor, at most a predetermined quantity of tokens surrounding the corresponding candidate anchor in a section of the document that includes the corresponding candidate anchor.

In some implementations, accessing the representation for the corresponding candidate anchor can include: accessing, for each of the two or more tokens included in the context, an embedding representation of the corresponding token; and encoding, for each of the two or more tokens and using the corresponding embedding representation, a vector for the corresponding token.

In some implementations, encoding the vector can include encoding, in a hidden space vector, data for the corresponding token using the context for the corresponding candidate anchor in the document.

In some implementations, encoding, for each of the two or more tokens and using the corresponding embedding representation, the vector for the corresponding token can use an encoder layer of a neural network that accepts, as input, the embedding representation for the corresponding token.

In some implementations, determining, for each of the two or more tokens included in the context for the corresponding candidate anchor, the attention of the corresponding token on the corresponding candidate anchor can use an attention layer in the neural network and the corresponding vector.

In some implementations, determining, using the representation for the corresponding candidate anchor and the attention of the tokens on the corresponding token, whether the duration of the corresponding token is likely included in the span of the temporal modifier can use a linear layer in the neural network, the vector for the corresponding candidate anchor, and the vector for the corresponding token.

In some implementations, the one or more candidate anchors can include two or more candidate anchors. Storing, in memory, the data for the document that indicates that the corresponding candidate anchor is an anchor for the temporal modifier can include storing, in memory, an array that includes a value a) for each candidate anchor in the two or more candidate anchors and b) that indicates whether the corresponding candidate anchor is an anchor for the temporal modifier.

In some implementations, the method can include providing, to another system, the data for the document that indicates that the corresponding candidate anchor is an anchor for the temporal modifier to cause the other system to perform one or more actions using the data.

In some implementations, the temporal modifier can include at least one of a date, a time, or a duration.

In some implementations, the candidate anchor can identify at least one of an event, a diagnosis, or an anatomical site.

In some implementations, the method can include a candidate anchor can include a word, a stemmed word, a lemmatized word, a phrase, or a sub-word element, a digit, a special character.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various implementations and may result in one or more of the following advantages. In some implementations, the systems and methods described in this document can more accurately determine temporal relationships for anchors included in a document, can enable creation of more accurate data structures that reflect temporal relationships, or a combination of both. For instance, the model can more accurately associate temporal modifiers, e.g., dates or times or both, to events, reducing false positives, reducing false negatives, or both, compared to other systems. By more accurately determining temporal relationships for anchors in a document, the systems and methods described in this specification can reduce false positives, reduce false negatives, or both, of various systems, e.g., downstream systems that perform actions using data that indicates associations between anchors and temporal modifiers, e.g., that a token is an anchor for a temporal modifier. For example, use of data that indicates associations between anchors and temporal modifiers, as generated by the systems and methods described in this specification, can improve an accuracy of a natural language processing system that uses the data.

In some implementations, the systems and methods described in this specification can improve actions performed by other systems that use the data, or other data generated using the data, that associates anchors and temporal modifiers. For instance, a downstream system that provides patient diagnoses, care management, clinical decision support, fraud analysis, network security analysis, remote patient education, e.g., for chronic disease, or a combination of these, can provide more accurate data for corresponding actions. This can result in improved population health given more accurate actions performed for the population given corresponding health conditions, e.g., reduce incorrect or incomplete diagnoses. For instance, by more accurately knowing dates when events occurred, the systems and methods described in this specification can provide better recommendations given those events. In some implementations, the systems and methods described in this specification can result in optimized resource allocation, e.g., within health plan systems or other types of systems, due to a more accurate analysis conducted for the performance of each measurement, e.g., National Committee for Quality Assurance ("NCQA") NCQA measurement. For instance, with more precise temporal relationships, health plans can obtain more accurate quality measurements and, therefore, reallocate their resources to enhance these measurements, leading to more efficient health plans.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
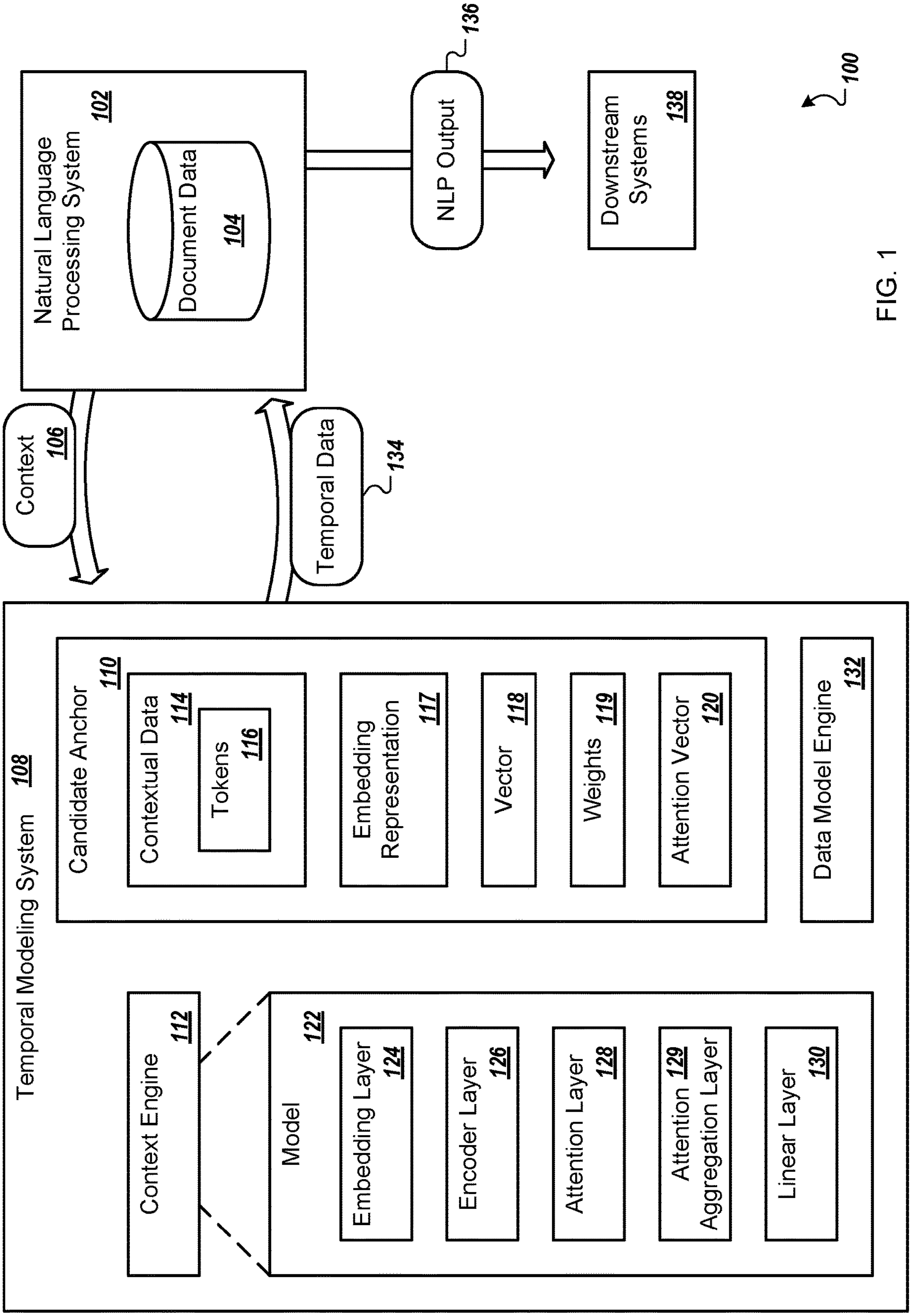
FIG. 1 depicts an example environment in which a natural language processing system receives temporal data from a temporal modeling system.

Natural language processing ("NLP") systems can analyze text from a document to determine relationships between phrases in the document. The document can be an electronic version of a hard copy document, e.g., a scanned hard copy document, or a document created initially as an electronic document.

To more accurately determine relationships between phrases included in the document, the NLP system can determine whether temporal phrases modify other phrases, e.g., corresponding anchors. An anchor can, for example, define a corresponding event, as described in more detail below. When an NLP accurately determines a relationship between an event and a temporal phrase, the NLP system can determine when the event likely occurred. This can be particularly difficult when a document includes phrases for multiple different events and the NLP system needs to differentiate between temporal phrases that apply to a subset of the events, e.g., to reduce a likelihood of a date over-attaching to the wrong events, a date not associating with an event when it should, or both.

A temporal modeling system can assign temporal modifiers to anchors, e.g., by creating a data structure that indicates that a token from the document is an anchor for a corresponding temporal modifier. In some examples, a temporal modifier can include one or more tokens. For instance, the temporal modeling system can use contextual information for the tokens from the document to determine which tokens are an anchor for the temporal modifier. By analyzing the contextual information for multiple tokens in a document with respect to a particular token, the temporal modeling system is more likely to accurately determine whether the particular token is an anchor for the temporal modifier, e.g., is contained within the temporal modifier.

In this specification, a temporal modifier contains an anchor when the span of the temporal modifier covers the entire duration of the anchor. For instance, when the temporal modifier is a particular date, e.g., Oct. 10, 2023, and an event is a network security event, e.g., indicating that a network security device was compromised, then the temporal modifier contains the network security event when that network security event occurred on the particular date.

In some implementations, a downstream system can process data generated by the temporal modeling system, an NLP system, or a combination of both. Sometimes the downstream system might require a temporal modifier to process certain data, e.g., for an event, without which such certain data might not be processable. In these implementations, by improving an accuracy of associating a temporal modifier with a corresponding token, whether for an event or otherwise, the systems and methods described in this specification can improve an accuracy of the downstream system. In some examples, an incorrect association of a date with a corresponding token might cause incorrect analysis by the downstream system. By improving an accuracy of associations between tokens and corresponding temporal modifiers, the systems and methods described in this specification can reduce a likelihood of that incorrect analysis occurring.

FIG. 1 depicts an example environment 100 in which a natural language processing system 102 receives temporal data 134 from a temporal modeling system 108. As discussed in more detail below, the temporal modeling system 108 can generate the temporal data 134 that indicates a relationship between a token from a document and a temporal modifier in the document.

The NLP system 102 maintains document data 104, e.g., in a database. The document data 104 can be any appropriate type of data, such as data that represents an electronic version of a hard copy document, an electronic document, or a combination of both. The document data 104 can include metadata. The metadata can indicate properties of the document, e.g., when the document was created, an author of the document, a source of the document, other appropriate metadata, or a combination of these.

As part of the NLP process, the NLP system 102 can determine relationships between phrases included in a document from the document data 104. For instance, the NLP system 102 can determine relationships between the phrases using tokens from the document. For instance, a token can be a word, a stemmed word, a lemmatized word, a phrase, or a sub-word element, a digit, a special character, e.g., a punctuation mark, while space, a new line, or a combination of these, from the document. Generally, these are referred to as "text elements" in this specification. When the NLP system 102 detects a temporal modifier in the document, the NLP system 102 can determine the other tokens in the document to which the temporal modifier applies. In some examples, a temporal modifier can include a date, a time, or a duration. For instance, the NLP system 102 can determine whether a duration of a corresponding token is included in the span of the temporal modifier, e.g., and the token is an anchor for the temporal modifier. In some examples, an anchor can include one or more tokens.

As part of this determination, the NLP system 102 can send context data 106 for the temporal modifier to a temporal modeling system 108 as part of a request for data that indicates any relationships the temporal modifier has with other tokens in the document. For instance, the NLP system 102 can determine the context from the document. Some examples of the context data 106 can include, for the document, the text, e.g., the tokens in the document, a document signature, data for sentence spans, data for section spans, data for paragraph spans, data for token spans, data for temporal modifier spans, data for candidate anchor spans, data for a temporal modifier signature, data for a candidate anchor signature, or a combination of two or more of these.

The context can be any appropriate size including a predetermined size. Some examples of the size can include a sentence, two or more consecutive sentences, e.g., five sentences, a predetermined quantity of consecutive tokens, e.g., 300 consecutive words, a predetermined quantity of tokens, e.g., before, after, or surrounding the temporal modifier. The context can include tokens from only a section in which the temporal modifier is located. In some examples, the context might not include tokens from other sections even though those tokens might otherwise be included in the predetermined quantity of tokens.

The temporal modeling system 108 receives the context data 106 from the NLP system 102 and processes the context data 106. The tokens included in the context data 106 can include tokens that are temporal modifiers, candidate anchors, or a combination of both. The temporal modeling system 108 can determine one or more candidate anchors 110 included in the context data 106. In some examples, a candidate anchor can define, e.g., be text describing, an event, e.g., network security event, a diagnosis, or an anatomical site. Different types of candidate anchors can be used depending on a type of the document, e.g., medical or network security to name a few examples.

The temporal modeling system 108 can store, maintain, or both, candidate anchor data in memory for each of the candidate anchors 110, e.g., in a database. The candidate anchor data can include the contextual data 114 for the corresponding candidate anchor, e.g., a subset of the context data 106. The context data 106 can include one or more tokens 116 from the document. The one or more tokens 116 can include tokens in the corresponding candidate anchor's 110 context. For instance, when the context data 106 received from the NLP system 102 is only for one candidate anchor, the contextual data 114 can be the same as the context data 106 and include the tokens from that context data 106.

The temporal modeling system 108 can receive the context data 106 that is for any appropriate number of candidate anchors, e.g., one or more candidate anchors or two or more candidate anchors. For instance, the temporal modeling system 108 can receive the context data 106 that offset pairs. Each offset pair can indicate an offset, in the context data with respect to a reference point, of a corresponding candidate anchor and temporal modifier. The reference point can be the beginning of the context data 106. When the context data 106 includes ten tokens, the second of which is a candidate anchor and the eighth of which is a temporal modifier, an offset pair can be [2,8] or [2,3], [8,9], depending on the implementation. When using the former implementation, [2,8] can indicate the start position of corresponding tokens, e.g., that have a predetermined size. In some examples, the context data 106 can include start offsets and length values. The length values can indicate a number of characters, or a number of tokens, for the respective temporal modifier or candidate anchor. When using the latter implementation, [2,3] can indicate the start and end character offsets, e.g., for the candidate anchor, and [8,9] can indicate the start and end character offsets, e.g., for the temporal modifier.

The temporal modeling system 108 can use offsets to account for different length candidate anchors, temporal modifiers, or both. For instance, when using start and end character offsets, the start offset can identify the beginning of a first token for the respective candidate anchor or temporal modifier and the end offset can identify the last token, or the end of the last token, for the respective candidate anchor or temporal modifier. When the temporal modeling system 108 uses two offsets, the predetermined size can account for different quantities of tokens.

In some implementations, the temporal modeling system 108 can receive context data 106 for multiple candidate anchors. In these implementations, the temporal modeling system 108 can receive a single set of context data 106 for multiple candidate anchors. For instance, the temporal modeling system 108 can receive the context data 106 that includes multiple offset pairs, each of which is for a corresponding candidate anchor. The offset pairs can identify a single temporal modifier, e.g., for all of the candidate anchors, or multiple temporal modifiers. For example, a first offset pair can identify a first candidate anchor and a first temporal modifier, and a second offset pair can identify the first candidate anchor and a second, different temporal modifier.

In some examples, the context data 106 can include one or more data subsets. Each subset can be for a pair of tokens: a temporal modifier and a candidate anchor for the temporal modifier. In these examples, the temporal modeling system 108 can process each data subset and determine whether the candidate anchor is an anchor for the temporal modifier. Each subset can have a corresponding offset pair or other identifiers that indicate the corresponding candidate anchor and temporal modifier.

The context data 106 need not include data for every pair of tokens that includes a temporal modifier. For instance, of the ten tokens includes two temporal modifiers and eight other tokens, the context data 106 can include five token pairs, e.g., fewer than the sixteen total possible token pairs. This can occur when the NLP system 102 determines that some, e.g., five, token pairs included candidate anchors while other, e.g., eleven, token pairs do not include candidate anchors; include candidate anchors that cannot be anchors for a corresponding temporal modifier, e.g., given a type of the token, a type of the temporal modifier, or both; or a combination of these.

The temporal modeling system 108 can process the data for a candidate anchor 110 using a context engine 112. The context engine 112 can analyze the contextual data 114 for the candidate anchor 110 and determine whether the candidate anchor 110 is an anchor for the temporal modifier. For instance, the context engine 112 can output a binary value that indicates whether or not the candidate anchor 110 is an anchor for the temporal modifier.

The context engine 112 can determine relationships between the tokens 116 in the contextual data 114 and use the relationships to determine whether the candidate anchor 110 is an anchor for the temporal modifier. For example, the context engine 112 can use an embedding representation 117 of the candidate anchor 110. The context engine 112, the NLP system 102, or a combination of both, can generate the embedding representation 117, e.g., using GloVe, or Word2Vec, or FastText, or the Embedding Layer 124 in Context Engine 112. The context engine 112 can use, as input, the contextual data 114, e.g., that includes a token sequence. The token sequence can be an ontology prepared token sequence, e.g., when the token sequence is prepared by the NLP system 102. The embedding representation can be a real-valued vector that encodes the meaning of the word in such a way that words that are closer in the vector space are expected to be similar in meaning. The embedding representation can approximate meaning and represent a word in a lower dimensional space.

The context engine 112 can generate, using the embedding representation 117, a vector 118 for the token. The vector 118 can include additional information about the token than the embedding representation alone. In some examples, the vector 118 can be a hidden space vector.

The context engine 112 can determine an attention of a token, e.g., a target token, on the candidate anchor 110. The context engine 112 can represent the attention as a weight 119. The weight 119 can indicate a likelihood that the corresponding token is likely related to the candidate anchor 110. The context engine 112 can use any appropriate range of values, e.g., between zero and one or zero and ten, for the weight 119.

The context engine 112 can determine a distance between the vectors 118. The context engine 112 can determine the weight 119 using the distance between the vectors 118, e.g., hidden space vectors. The context engine 112 can determine the weight using any appropriate process, e.g., a local attention mechanism or a global attention mechanism. The context engine 112 can determine weights for pairs of tokens, e.g., a target token and other tokens in the contextual data 114, optionally including itself. This can include determining a weight using the distance between the hidden space vectors for the target token and the candidate anchor 110. The context engine 112 can normalize the distances between the tokens and the candidate anchors 110, e.g., for each of the tokens 116. The context engine 112 can use the normalized values as the weights 119.

For instance, the context engine 112 can determine a target token from the tokens 116. The target token can include any appropriate token, e.g., the candidate anchor 110 or another token. The context engine 112 can calculate the weights of tokens, e.g., every token, in the tokens 116 on the target token, e.g., including a weight of the target token on itself.

For example, a token sequence that includes the tokens 116 can be [A, B, C]. When the target token is B, the context engine 112 can calculate the weight between A and B as f(P(A|B)), e.g., a value depending on a conditional probability that contains a direction. In this example for f(P(A|B)), the weight direction is from A to B. Similarly, the context engine 112 can calculate f(P(B|B)) and f(P(C|B)) with weight directions from B to B and C to B, respectively. When the context engine 112 uses A as the target token, the context engine 112 can determine weights for f(P(A|A)), f(P(B|A)), and f(P(C|A)). The context engine 112 would similarly determine three weights for the target token C.

The context engine 112 can normalize the weights using any appropriate process. For instance, the context engine 112 can normalize the weights using softmax.

The context engine 112 determines a combination of data for the token and one or more other tokens, e.g., the candidate anchor 110, the token itself, other tokens, or a combination of these. In some examples, the context engine 112 can determine the combination for each pair of tokens 116 in the contextual data 114, e.g., even when the pair does not include the candidate anchor 110. This can increase the accuracy of the output when the temporal modifier might modify another token in the contextual data 114.

For example, the context engine 112 can determine, as the combination, a weighted sum of pairs of vectors. This can include the context engine 112 multiplying a vector 118 for a target token by the corresponding weight 119. The context engine 112 can repeat this multiplication process for other tokens in the tokens 116, e.g., for all other tokens.

The context engine 112 can add the vectors, e.g., the weighted vectors. For instance, the context engine 112 can add all weighted vectors using element-wise addition. The context engine 112 can normalize the elements in the resultant vector. The context engine 112 can use the resultant vector, e.g., the normalized weighted combined vector, as the vector for the target token.

The context engine 112 can use the weighted, combined output as an attention vector 120 for the corresponding target token. In some examples, the context engine 112 can use the attention vector to determine whether the candidate anchor 110 is an anchor for the temporal modifier. An attention vector can be the output of the attention layer 128, described in more detail below. The attention vector can include multiple attention values. In some examples, the values in the attention vector can be the distance-based weighted-sum of the hidden vectors from the encoder layer 126, described in more detail below. The attention vector can contain the contextual information from the tokens 116, e.g., all tokens 116. In some implementations, the contextual information in the attention vector can have better capture of information from distant tokens compared to the output from the encoder layer 126.

In implementations in which the context engine 112 computes values for each pair of tokens, the context engine 112 can generate an attention vector 120 for each token. Each attention vector 120 can include any appropriate quantity of values, e.g., one value for each token in the tokens 116. For instance, when there are three total tokens, the vector can have three values each of which correspond to a combined, weighted value computed as described above.

The context engine 112, e.g., the linear layer 130, can use the attention vectors 120, e.g., an aggregated attention vector for the contextual data 114, to determine whether the candidate anchor 110 is an anchor for the temporal modifier. The context engine 112 can output a binary value that indicates whether the candidate anchor 110 is an anchor for the temporal modifier.

The context engine 112 can generate the aggregated attention vector using the data for the tokens 116, e.g., all tokens 116. For instance, the context engine 112 can use the attention vectors 120 for the tokens 116 to generate the aggregated attention vector. In some examples, the context engine 112 can add target token attention vectors and temporal modifier token attention vectors element-wise when generating the aggregated attention vector. In some examples, the context engine 112 can combine the attention vectors of the candidate anchor and the temporal modifier element-wise to generate the aggregated attention vector. After generating the aggregated attention vector, the context engine 112 can feed the aggregated attention vector to the linear layer 130 for binary prediction.

In implementations in which the temporal modeling system 108 receives context data 106 for multiple candidate anchors 110, a data model engine 132 can generate temporal data 134 that indicates which of the candidate anchors 110 are actually anchors for corresponding temporal modifiers. For instance, the data model engine 132 can generate a structured representation that includes the binary value for the output from the context engine 112 and other, e.g., essential, metadata for the candidate anchor and temporal modifier, such as the offsets of each. An offset for the candidate anchor, the temporal modifier, or both, can a pair of integers in a pair of parentheses, e.g., "(1, 10)," such that the first integer indicates the beginning index of the first character of the corresponding token in the document, and the second integer indicates the index of the ending character of the corresponding token. The data model engine 132 can generate the structured representation using an order in which the temporal modeling system 108 received data from the NLP system 102 or any other appropriate order.

In some implementations, the context engine 112 can include a model 122. The model 122 can be any appropriate type of model. For instance, the model can include, as at least some layers, a neural network with one or more layers 126-128. Each of the layers 126-128 can perform at least some of the operations described above. The encoder layer 126 can be any appropriate type of neural network, such as a long short-term memory ("LS™"), a gated recurrent unit ("GRU"), or a combination of these. The attention layer 128 can contain any appropriate type of attention mechanisms, a local attention mechanism, a global attention mechanism, a self attention mechanism, e.g., the core of the transformer model, or a combination of these. Although the neural network 122 is described with reference to two layers, in some implementations, at least some of these layers can include multiple layers, e.g., that perform operations described with reference to the corresponding layer.

The temporal modeling system 108, the model 122, or a combination of both, can be a model wrapped in a microservice with a web server gateway interface backend, e.g., a Nginx-uWSGI-Flask backend. The microservice can be containerized. The web server gateway interface can use a REST API for communication with other components in the environment 100, e.g., the NLP system 102.

The model 122 can include an embedding layer 124. The embedding layer 124 can map tokens in the context data 106, e.g., included in the context data 106 and encoded by the NLP system 102, to an embedding space, e.g., a hidden space. The embedding layer 124 can encode tokens, e.g., from the context data 106, into an embedding space. The embedding layer 124 can output a word embedding for the tokens, e.g., as the embedding representation 117. For instance, when the contextual data 114 for a candidate anchor 110 includes ten tokens, the embedding layer 124 can output ten embedding representations 117.

An encoder layer 126 included in the neural network 122 can encode additional information into the embedding information for a token. For instance, the encoder layer 126 can receive input from the embedding layer 124, e.g., an embedding representation 117. The encoder layer 126 can be a Long Short Term Memory ("LS™") model, a Gated Recurrent Unit ("GRU") model, a bi-directional LS™ ("BILS™") model, a bi-directional GRU ("BiGRU") model, or a combination of two or more of these. In some examples, the encoder layer 126 can include multiple sublayers.

The encoder layer 126 can generate a vector 118 for each of the tokens included in the contextual data 114 for a candidate anchor 110. For instance, the encoder layer 126 can extract data from the embedding representation 117 to determine contextual information for the corresponding token. The encoder layer 126 can encode the corresponding token 116 with the contextual information in the vector 118. The vector can be a hidden space vector for the corresponding token 116. The vector can have a larger size than the embedding representation for the corresponding token. For instance, the vector 118 can be a 1000 dimension vector.

An attention layer 128 included in the neural network 122 can calculate attention values, e.g., as values for an output hidden space vector, of each token in the contextual data 114 for the candidate anchor 110 on tokens in the contextual data 114, e.g., the other tokens or all tokens including itself. The attention layer 128 can calculate the attention values as values in the corresponding attention vector 120. The attention layer 128 can have a self-attention mechanism. The self-attention mechanism can calculate, e.g., using the vector 118, attention values of each token on the other tokens in the contextual data. The attention values can be cosine similarity or any other appropriate type of value.

In some implementations, the attention layer 128 can use weights to calculate the attention values for the attention vector 120, e.g., as described above. For example, the attention layer 128 can calculate, for an attention value, a distance between a pair of tokens to which the attention value corresponds. The distance can be between the corresponding vectors 118 for the tokens that the attention layer 128 receives from the encoder layer 126, e.g., a sum of products of the values in the vectors 118. The attention layer 128 can use the distance to determine a weight for the pair of tokens, e.g., by normalizing the distances. The attention layer 128 can determine a weighted sum across all vectors 118, e.g., hidden space vectors 118, for the contextual data 114 to determine an attention vector 120 for each vector.

For example, an implementation with two vectors can include vector 1=[1,2,3] and vector 2=[0, 0, 1]. For the weights for vector 1, weight 1−1=1*1+2*2+3*3=14, and weight 1−2=1*0+2*0+3*1=3. For the normalization process, the context engine 112, e.g., the attention layer 128, compute normalized weight 1−1=14/(14+3)=0.82, and normalized weight 1−2=3/(14+3)=0.18. The attention layer 128 can use these normalized weights to determine the attention vector 120 for the vector 1.

The attention layer 128 can generate the attention vector 120 for each token using the attention values. For instance, the attention layer 128 can generate weighted vectors as the other vector for each token. When the contextual data 114 includes three tokens, the encoder layer 126 can output three vectors 118: vector 1, vector 2, and vector 3. The attention layer 128 can compute weights for these vectors as: weight 1-1, weight 1-2, weight 1-3, weight 2-1, weight 2-2, weight 2-3, weight 3-1, weight 3-2, and weight 3-3, e.g., as described above. To generate the attention vectors 120, the attention layer 128 can compute the three values for the first attention vector as value 11, value 21, value 31. The attention layer 128 can compute for the first token value 11=vector 1*weight 1-1, for the second token value 21=vector 2*weight 1-2, and for the third token value 31=vector 3*weight 1-3, add the three values element-wise, and normalize the sum vector to be an attention vector 120 for the first token. When the values, e.g., weighted values, are value 11=[a,b,c], value 21=[d, e, f], value 31=[g, h, i], adding the three values element-wise results in the first attention vector 120 [a+d+g, b+e+h, c+f+i].

For the second attention vector for the second token, the attention layer 128 can compute the three values as value 12=vector 1*weight 2-1, value 22=vector 2*weight 2-2, and value 23=vector 3*weight 2-3, add the three values element-wise, and normalize the sum vector to be the second attention vector 120 for the second token. Similarly, the attention layer 128 can compute values for the third attention vector for the third token.

An attention aggregation layer 129 can aggregate attention vectors 120 for all tokens 116 in the contextual data 114, e.g., by the hidden space dimension. This hidden space can be different from the embedding space for the embedding representations 117, the space for the vectors 118 generated by the encoder layer 126, or both. This aggregation process can generate an aggregated attention vector. The attention aggregation layer 129 can aggregate the attention vectors using any appropriate process. The aggregated attention vector can include values for each token in the tokens 116 that indicate the influence of the token on the corresponding candidate anchor 110.

In some implementations, the attention aggregation layer 129 can use an attention weight vector of the same dimension, e.g., the length of a vector, as an attention vector 120 output from the attention layer 128, in which each element quantifies the importance of the corresponding dimension to the final aggregated attention vector.

The attention aggregation layer 129 can use an attention weight vector, wt, determined using Equation (1), below. The temporal modeling system 108, or another system, can randomly initialize the attention weight vector wt at the beginning of training. The temporal modeling system 108 can update the attention weight vector wt using data from one or more training examples, e.g., on every training example.

$$wt = \begin{bmatrix} aw_1 \\ aw_2 \\ aw_3 \\ aw_4 \\ aw_5 \end{bmatrix} \tag{1}$$

The aggregation layer 129 can generate an attention matrix, attn, using the attention vectors 120 for the candidate anchor 110. For instance, if the dimension of every attention vector 120 for a candidate anchor 110 is five and there are three tokens 116, the context engine 112 can generate an attention matrix, attn, of size 3 by 5 for the attention vectors 120, using Equation (2), below. In the attention matrix attn, each row can include the values for a corresponding one of the attention vectors 120.

$$attn = \begin{bmatrix} V_{11} & V_{12} & V_{13} & V_{14} & V_{15} \\ V_{21} & V_{22} & V_{23} & V_{24} & V_{25} \\ V_{31} & V_{32} & V_{33} & V_{34} & V_{35} \end{bmatrix} \tag{2}$$

The attention aggregation layer 129 can compute an attention aggregation vector, dw, using Equation (3) below. For instance, the attention aggregation layer 129 can combine, e.g., multiply, the attention matrix attn with the attention weight vector wt to determine the attention aggregation vector dw. The values $dw_1$, $dw_2$, $dw_3$ in the attention aggregation vector dw can each represent the importance of corresponding dimension to the final aggregated attention vector.

The attention aggregation layer 129 can compute an attention aggregation matrix, agg, using the attention matrix attn and the attention aggregation vector wt. For instance, the attention aggregation layer 192 can compute an aggregation vector transpose, $dw^T$, of the aggregation vector wt. The attention aggregation layer 129 can combine, e.g., multiply, the aggregation vector transpose, $dw^T$ with the attention matrix attn to calculate the attention aggregation matrix agg, e.g., using Equation (4) below.

$$agg = dw^T \times attn = [dw_1, dw_2, dw_3] \times \begin{bmatrix} V_{11} & V_{12} & V_{13} & V_{14} & V_{15} \\ V_{21} & V_{22} & V_{23} & V_{24} & V_{25} \\ V_{31} & V_{32} & V_{33} & V_{34} & V_{35} \end{bmatrix} \tag{4}$$

The attention aggregation layer 129 can generate an aggregated attention vector, e.g., $agg^T$, using the attention aggregation matrix agg. For instance, the attention aggregation layer 129 can transpose the attention aggregation matrix agg to calculate the aggregated attention vector $agg^T$, e.g., using Equation (5) below.

$$agg^T = \begin{bmatrix} dw_1 * V_{11} + dw_2 * V_{21} + dw_3 * V_{31} \\ dw_1 * V_{12} + dw_2 * V_{22} + dw_3 * V_{32} \\ dw_1 * V_{13} + dw_2 * V_{23} + dw_3 * V_{33} \\ dw_1 * V_{14} + dw_2 * V_{24} + dw_3 * V_{34} \\ dw_1 * V_{15} + dw_2 * V_{25} + dw_3 * V_{35} \end{bmatrix} \quad (5)$$

In some examples, the attention aggregation layer 129 can activate values for the aggregated attention vector. For instance, the attention aggregation layer 129 can, as part of the activation process, apply a non-linear function to the vector. This application can introduce non-linearity to the model 122, e.g., rendering the model the capability of making decisions, e.g., 0 or 1, or yes or no. Some examples of activation functions include hyperbolic tangent, sigmoid, ReLU, Softmax, or GeLU. After activation, this 5*1 aggregated attention vector $agg^T$ can be the representation of the contextual data 114 after all attention operations.

A linear layer 130 included in the neural network 122 can determine whether a candidate anchor 110 is an anchor for a corresponding temporal modifier. The linear layer 130 can receive, as input, the aggregated attention vectors for the candidate anchor 110 and, optionally, data for the corresponding temporal modifier. The data for the corresponding temporal modifier can include an identifier for the temporal modifier or a copy of the temporal modifier. Given the above example of three attention vectors 120, the linear layer 130 would receive those one aggregated attention vector as input.

The linear layer 130 can be any appropriate type of layer, can perform any appropriate type of operations, or a combination of both. For instance, the linear layer 130 can predict a likelihood that the candidate anchor 110 is an anchor for the temporal modifier. The linear layer 130 can perform a logistic regression on the input to determine a likelihood that the candidate anchor 110 is an anchor for the temporal modifier, e.g., if a duration of the candidate anchor 110 is included in a span of the temporal modifier.

The linear layer 130 can output a value that indicates whether the candidate anchor 110 is an anchor for the temporal modifier. The value can be any appropriate value, such as a probability between 0 and 1, a binary value or another value that indicates yes or no whether the candidate anchor 110 is an anchor for the temporal modifier.

The temporal modeling system 108 can provide the output from the linear layer 130 to the NLP system 102, the data model engine 132, or a combination of both. In the latter instance, the data model engine 132 can receive the output from the linear layer 130 and prepare a data structure for the NLP system 102 that indicates which candidate anchors 110 for the context data 106 are actually anchors for corresponding temporal modifiers.

The NLP system 102 receives the temporal data 134 from the temporal modeling system 108 that indicates whether the candidate anchor 110 is an anchor for a corresponding temporal modifier, e.g., included in the tokens 116. The NLP system 102 can update a corresponding data structure to indicate the result of whether the candidate anchor 110 is an anchor for a corresponding temporal model. For instance, when the NLP system 102 has data that indicates a relationship between the candidate anchor 110 and the corresponding temporal model but the temporal data 134 indicates that the candidate anchor 110 is not an anchor for the temporal model, the NLP system 102 can update the data indicating the relationship to indicate that there is not a relationship, delete the data, or a combination of both. When the NLP system 102 does not have any data indicating a relationship and the temporal data 134 indicates that the candidate anchor 110 is an anchor for a corresponding temporal modifier, the NLP system 102 can add data, e.g., to the document data 104, to represent the relationship. When the NLP system 102 previously determined accurate whether or not there was a relationship which determination is verified by the temporal data 134, the NLP system 102 can determine to skip updating data in the NLP system 102, whether that data would indicate a relationship or not.

As a result of receiving the temporal data 134, the NLP system 102 can more accurately determine relationships between temporal modifiers and other tokens in a document. This can enable the NLP system 102 to generate more accurate NLP output data 136 for the document, e.g., more accurate NLP data.

The NLP system 102 can provide the NLP output data 136 to one or more downstream systems 138. The downstream systems 138 are systems that perform one or more actions using the NLP output data 136. By receiving the more accurate NLP output data 136, e.g., as compared to other environments, the downstream systems 138 are able to make more accurate decisions, predictions, or both, for the data in the document. For instance, the downstream systems 138 can include a network security system, a care management system, a clinical decision support system, a fraud detection system, a risk analysis system, or a combination of these. Given the more accurate NLP output data 136, the downstream systems 138 can more accurately analyze the data for a document and perform a corresponding action, e.g., can more accurately make an inference about the input document.

Table 1, below, provides an example of a portion of a document. The document can be an electronic document that is a scanned document. In some examples, the document can be an electronic document, e.g., a PDF, that does not necessarily have data that associates dates with corresponding anchors.

In Table 1, the contextual data includes maintenance data. The maintenance data can be for any appropriate type of entity. When the NLP system 102 provides the data in Table 1 as the context data 106, the temporal modeling system 108 analyzes the data to determine one or more anchors for the date "1/1/2020" as a temporal modifier. In this example, the temporal modeling system 108 determines that the phrase "test procedure" is an anchor for the date 1/1/2020, e.g., that the event test procedure occurred on the date. Further, the temporal modeling system 108 determines that the phrase "system update" is not an anchor for date 1/1/2020, e.g., given performance of the process described above. As a result, the NLP system 102 and any downstream systems 138 can more accurately determine data for the document that includes the text from Table 1.

TABLE 1

| example document contextual data |
|---|
| System maintenance:<br>Test procedure Jan. 1, 2020<br>System update performed given recent virus |

Table 2, below, provides another example of a portion of a document. In Table 2, the contextual data includes data about a system update and other irrelevant information. When the temporal modeling system 108 analyzes the data from Table 2, the temporal modeling system 108 determines that the event "system update" is an anchor for the date, e.g., temporal modifier, "4/16/2021." The temporal modeling system 108 determines that any phrases, e.g., candidate anchors, in the irrelevant information are not anchors for the date.

TABLE 2

| example document contextual data |
| --- |
| Apr. 16, 2021<br>System update given recent virus<br>Irrelevant information |

The temporal modeling system 108, the NLP system 102, and the downstream systems 138 are examples of systems implemented as computer programs on one or more computers in one or more locations, in which the systems, components, and techniques described in this specification are implemented. The network (not shown), such as a local area network ("LAN"), wide area network ("WAN"), the Internet, or a combination thereof, connects the temporal modeling system 108, the NLP system 102, and the downstream systems 138. The temporal modeling system 108 can use a single server computer or multiple server computers operating in conjunction with one another, including, for example, a set of remote computers deployed as a cloud computing service.

The temporal modeling system 108 can include several different functional components, including the context engine 112, the data model engine 132, or a combination of these, can include one or more data processing apparatuses, can be implemented in code, or a combination of both. For instance, each of the context engine 112, and the data model engine 132 can include one or more data processors and instructions that cause the one or more data processors to perform the operations discussed herein.

The various functional components of the temporal modeling system 108 can be installed on one or more computers as separate functional components or as different modules of a same functional component. For example, the context engine 112, the data model engine 132 of the temporal modeling system 108 can be implemented as computer programs installed on one or more computers in one or more locations that are coupled to each through a network. In cloud-based systems for example, these components can be implemented by individual computing nodes of a distributed computing system.

Figure 2:
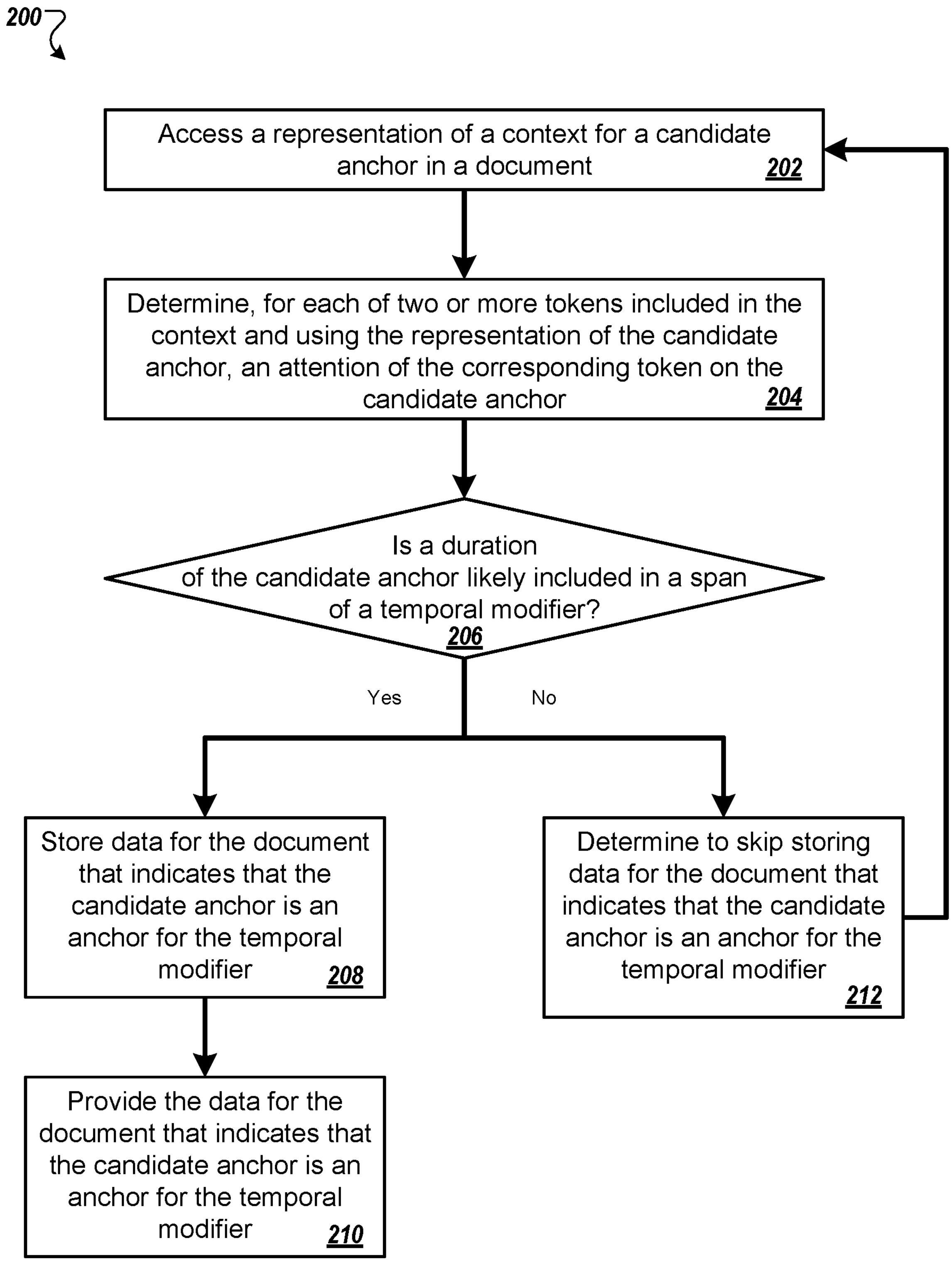
FIG. 2 is a flow diagram of an example process for associating a candidate anchor with a temporal modifier.

FIG. 2 is a flow diagram of an example process 200 for associating a candidate anchor with a temporal modifier. For example, the process 200 can be used by the temporal modeling system 108 from the environment 100.

A temporal modeling system accesses a representation of a context for a candidate anchor in a document (202). The temporal modeling system can use any appropriate process to access the representation. The representation can include an embedding representation, e.g., a single embedding representation for the candidate anchor, or multiple embedding representations for the tokens included in the context. The temporal modeling system, e.g., an embedding layer, can generate the representation. In some examples, the temporal modeling system receives the representation from another system, e.g., from an NLP system. In some examples, the temporal modeling system can encode a vector for each token using a corresponding embedding representation and an encoder layer.

The temporal modeling system determines, for each of two or more tokens included in the context and using the representation of the candidate anchor, an attention of the corresponding token on the candidate anchor (204). For instance, the temporal modeling system can use one or more of the vectors as input to the attention layer to determine the attention. In some examples, the temporal modeling system can use a first vector for the candidate anchor and a second vector for the token as input to the attention layer to determine the attention of the token on the candidate anchor. The temporal modeling system can represent the attention as an attention value.

The temporal modeling system determines whether a duration of the candidate anchor is likely included in a span of a temporal modifier (206). For instance, the temporal modeling system can use the attention values and the representation of the candidate anchor to determine whether the duration of the candidate anchor is likely included in the temporal modifier's span. This can include determining whether an event represented by the candidate anchor likely occurred on or during the temporal modifier's span. When the temporal modifier is a date, the corresponding span is the time included in that date, e.g., the twenty-four hour time period.

In some implementations, the data in a document is not necessarily completely accurate. Although the data might indicate that an event occurred at a particular time, on a particular date, or both, that data might be an approximation of when the event actually occurred. As a result, although the temporal modeling system can determine whether the duration of the candidate anchor is likely included in the span of a temporal modifier, the event to which the candidate anchor corresponds might not have occurred exactly within the span of the temporal modifier. For instance, when the temporal modifier includes a time, e.g., 11/3/2023 at 12:02 am ET, a candidate anchor can be an anchor for the temporal modifier when an actual time for the candidate anchor satisfies a similarity criterion for the temporal modifier. For example, a candidate anchor that indicates that a birth occurred on a particular date can be an anchor for a temporal modifier for an adjacent date since the date might not be completely accurate, e.g., if the clock indicates the wrong day, time, or both. Although the birth might have actually happened on 11/2/2023 at 11:59 pm ET, the temporal modeling system would determine that the candidate anchor for the birth is likely included in the span of the temporal modifier given the corresponding data in the document. To the extent to which such a discrepancy might be reflected across data from different documents, the temporal modeling system can use the similarity criterion to account for such discrepancies. This can occur when the temporal modeling system determines that the time for the candidate anchor is likely represented by the temporal modifier's time, e.g., that the temporal modifier's time is meant to represent the time for the candidate anchor whether or not the actual time for the candidate anchor occurred exactly at that time.

Some examples of a duration for a temporal modifier can include "January 2022," "a two hour period on 1/1/2020," and "1/1/2020 from 8 am-2 pm." The temporal modifier can include other appropriate durations.

The temporal modeling system stores data for the document that indicates that the candidate anchor is an anchor for the temporal modifier (208). For instance, in response to determining that the duration of the candidate anchor is likely included in the span of the temporal modifier, the temporal modeling system can store the data. The temporal modeling system can store the data in a data structure, e.g., in a vector when the temporal modeling system generates output data for multiple candidate anchors.

The temporal modeling system provides the data for the document that indicates that the candidate anchor is an anchor for the temporal modifier (210). For example, the temporal modeling system can provide the data to an NLP system that performs natural language processing of a document that includes the candidate anchor and the temporal modifier. By using the data that indicates that the candidate anchor is an anchor for the temporal modifier, the NLP system can more accurately perform natural language processing than other systems. By providing the data to the other system, the temporal modeling system can cause the other system to perform one or more actions, e.g., more accurately than would otherwise be performed. The other actions can include natural language processing, analysis of NLP data, or a combination of both, potentially performed by different systems.

The temporal modeling system determines to skip storing data for the document that indicates that the candidate anchor is an anchor for the temporal modifier (212). For instance, in response to determining that the duration of the candidate anchor is not likely included in the span of the temporal modifier, the temporal modeling system can determine to skip storing the data.

In some examples, instead of determining to skip storing data, the temporal modeling system can store different data that indicates the lack of a temporal relationship between the candidate anchor and the temporal modifier, e.g., that the candidate anchor is not an anchor for the temporal modifier. The temporal modeling system can provide the different data to another system, e.g., the NLP system, to cause the other system to perform one or more actions using the different data. For instance, when the other system has data that indicates a potential temporal relationship between the candidate anchor and the anchor, the other system can delete that data indicating the potential temporal relationship. By providing the other data, the temporal modeling system can cause the other system to be more accurate, e.g., by not performing natural language processing with the data indicating the potential temporal relationship when the temporal modeling system determined that such relationship is unlikely.

In some implementations, the process 200 can include additional operations, fewer operations, or some of the operations can be divided into multiple operations. For example, the process 200 can include operations 202 through 210 without the operation 212. In some examples, the process 200 can include operations 202 through 206 and 212 without the operations 208 and 210.

In this specification, the term "database" is used broadly to refer to any collection of data: the data does not need to be structured in any particular way, or structured at all, and it can be stored on storage devices in one or more locations. A database can be implemented on any appropriate type of memory.

An electronic document, which for brevity will simply be referred to as a document, may, but need not, correspond to a file. A document may be stored in a portion of a file that holds other documents, in a single file dedicated to the document in question, or in multiple coordinated files.

In this specification the term "engine" is used broadly to refer to a software-based system, subsystem, or process that is programmed to perform one or more specific functions. Generally, an engine will be implemented as one or more software modules or components, installed on one or more computers in one or more locations. In some instances, one or more computers will be dedicated to a particular engine. In some instances, multiple engines can be installed and running on the same computer or computers.

A number of implementations have been described. Nevertheless, it will be understood that various modifications may be made without departing from the spirit and scope of the disclosure. For example, various forms of the flows shown above may be used, with steps re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 3:
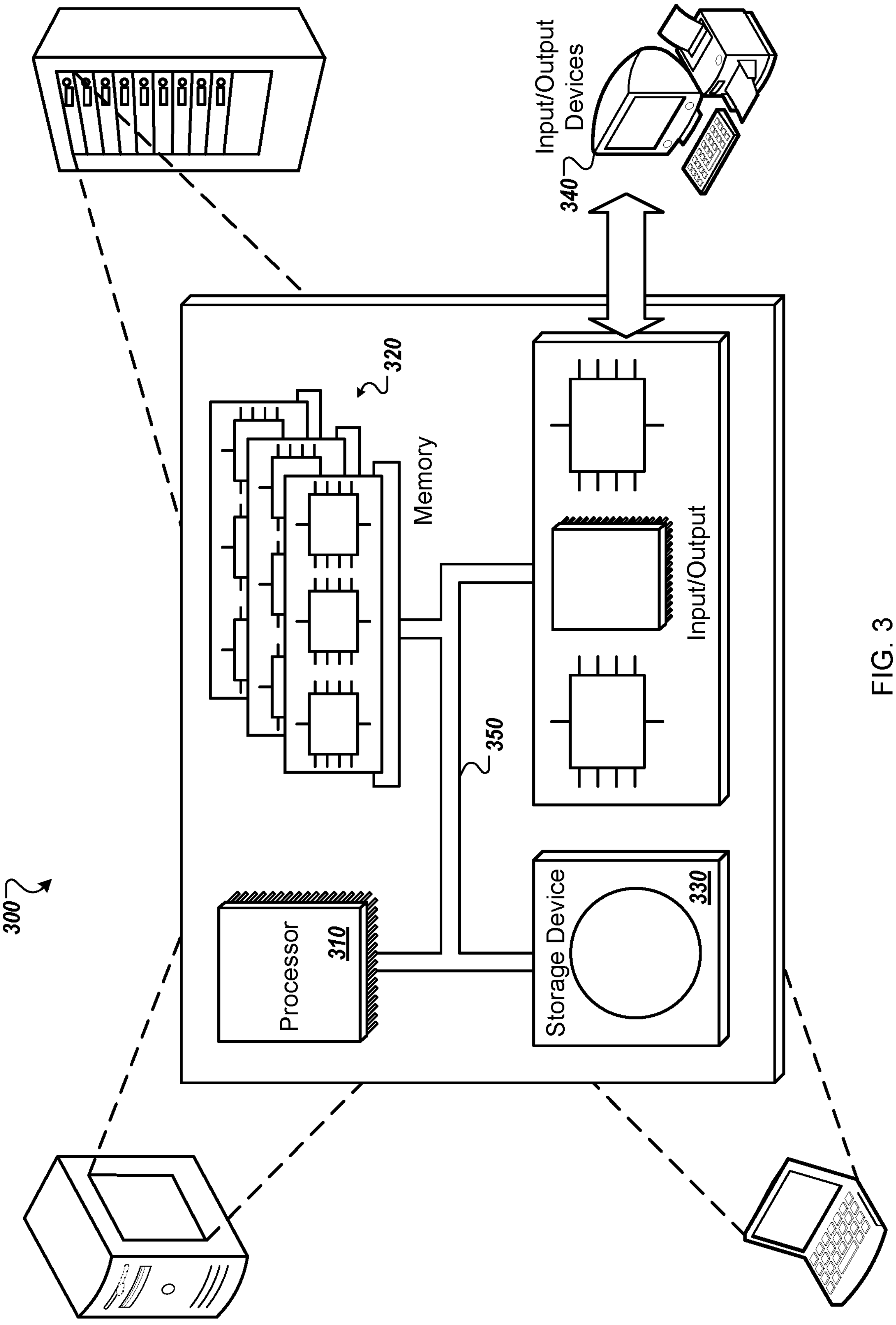
FIG. 3 is a block diagram of a computing system that can be used in connection with computer-implemented methods described in this specification.

An example of one such type of computer is shown in FIG. 3, which shows a schematic diagram of a computer system 300. The computer system 300 can be used for the operations described in association with any of the computer-implemented methods described previously, according to some implementations. The computer system 300 includes a processor 310, a memory 320, a storage device 330, and an input/output device 340. Each of the components 310, 320, 330, and 340 are interconnected using a system bus 350. The processor 310 is capable of processing instructions for execution within the computer system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the computer system 300. In some implementations, the memory 320 is a computer-readable medium. In some implementations, the memory 320 is a volatile memory unit. In some implementations, the memory 320 is a non-volatile memory unit.

The storage device 330 is capable of providing mass storage for the computer system 300. In some implementations, the storage device 330 is a computer-readable medium. In some implementations, the storage device 330 can be a floppy disk device, a hard disk device, an optical disk device, or a tape device.

The input/output device 340 provides input/output operations for the computer system 300. In some implementations, the input/output device 340 includes a keyboard, a pointing device, a touchscreen, or a combination of these. In some implementations, the input/output device 340 includes a display unit for displaying graphical user interfaces. In some implementations, the input/output device 340 includes a microphone, a speaker, or a combination of both.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular implementations of the invention have been described. Other implementations are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method comprising:

for each of one or more candidate anchors included in a plurality of tokens for a document, the plurality of tokens including a) at least one temporal modifier with a span, and b) at least one anchor i) for the temporal modifier and ii) that has a duration at least partially included in the span of the temporal modifier:

accessing a representation of a context for the corresponding candidate anchor in the document, comprising, for each of two or more tokens included in the context:

accessing an embedding representation for the corresponding token; and encoding, using the embedding representation, a vector for the corresponding token;

determining, for each of the two or more tokens included in the context for the corresponding candidate anchor and using the representation of the corresponding candidate anchor, a likelihood that the corresponding token is related to the corresponding candidate anchor; and determining, using the representation for the candidate anchor and the likelihoods that the tokens are related to the corresponding candidate anchor, whether a duration of the corresponding candidate anchor is likely included in the span of the temporal modifier; and in response to determining, for at least one candidate anchor from the one or more candidate anchors, that the duration of the corresponding candidate anchor is likely included in the span of the temporal modifier, storing, in memory, data for the document that indicates that the corresponding candidate anchor is an anchor for the temporal modifier.

2. The method of claim 1, comprising converting, for each of two or more text elements in the document, the corresponding text element to a corresponding token from the plurality of tokens.

3. The method of claim 1, comprising converting, for at least one of the one or more candidate anchors, the corresponding candidate anchor to an embedding representation, wherein determining the likelihood that the corresponding token is related to the corresponding candidate anchor uses the embedding representation of the corresponding candidate anchor.

4. The method of claim 1, comprising:

receiving, from another system, second data that includes the context for the corresponding candidate anchor in the document; and providing, to the other system, the data for the document that indicates that the corresponding candidate anchor is an anchor for the temporal modifier.

5. The method of claim 1, wherein the context comprises, for the corresponding candidate anchor, at most a predetermined quantity of tokens surrounding the corresponding candidate anchor in the document.

6. The method of claim 1, wherein the context comprises, for the corresponding candidate anchor, at most a predetermined quantity of tokens surrounding the corresponding candidate anchor in a section of the document that includes the corresponding candidate anchor.

7. The method of claim 1, wherein encoding the vector comprises encoding, in a hidden space vector, data for the corresponding token using the context for the corresponding candidate anchor in the document.

8. The method of claim 1, wherein:

the one or more candidate anchors comprise two or more candidate anchors; and storing, in memory, the data for the document that indicates that the corresponding candidate anchor is an anchor for the temporal modifier comprises storing, in memory, an array that includes a value a) for each candidate anchor in the two or more candidate anchors and b) that indicates whether the corresponding candidate anchor is an anchor for the temporal modifier.

9. The method of claim 1, comprising providing, to another system, the data for the document that indicates that the corresponding candidate anchor is an anchor for the temporal modifier to cause the other system to perform one or more actions using the data.

10. The method of claim 1, wherein the temporal modifier comprises at least one of a date, a time, or a duration.

11. The method of claim 1, wherein the candidate anchor identifies at least one of an event, a diagnosis, or an anatomical site.

12. The method of claim 1, wherein a candidate anchor comprises a word, a stemmed word, a lemmatized word, a phrase, or a sub-word element, a digit, a special character.

13. The method of claim 1, wherein:

encoding, for each of the two or more tokens and using the corresponding embedding representation, the vector for the corresponding token uses an encoder layer of a neural network that accepts, as input, the embedding representation for the corresponding token; and determining, for each of the two or more tokens included in the context for the corresponding candidate anchor, the likelihood that the corresponding token is related to the corresponding candidate anchor uses an attention layer in the neural network and the corresponding vector.

14. The method of claim 13, wherein determining, using the representation for the corresponding candidate anchor and the likelihoods that the tokens are related to the corresponding candidate anchor, whether the duration of the corresponding candidate anchor is likely included in the span of the temporal modifier uses a linear layer in the neural network, a second vector for the corresponding candidate anchor, and the vector for the corresponding token.

15. One or more non-transitory computer storage media encoded with instructions that, when executed by one or more computers, cause the one or more computers to perform operations comprising:

for each of one or more candidate anchors included in a plurality of tokens for a document, the plurality of tokens including a) at least one temporal modifier with a span, and b) at least one anchor i) for the temporal modifier and ii) that has a duration at least partially included in the span of the temporal modifier:

accessing a representation of a context for the corresponding candidate anchor in the document, comprising, for each of two or more tokens included in the context:

accessing an embedding representation for the corresponding token; and encoding, using the embedding representation, a vector for the corresponding token;

determining, for each of the two or more tokens included in the context for the corresponding candidate anchor and using the representation of the corresponding candidate anchor, a likelihood that the corresponding token is related to the corresponding candidate anchor; and determining, using the representation for the candidate anchor and the likelihoods that the tokens are related to the corresponding candidate anchor, whether a duration of the corresponding candidate anchor is likely included in the span of the temporal modifier; and in response to determining, for at least one candidate anchor from the one or more candidate anchors, that the duration of the corresponding candidate anchor is likely included in the span of the temporal modifier, storing, in memory, data for the document that indicates that the corresponding candidate anchor is an anchor for the temporal modifier.

16. The computer storage media of claim 15, the operations comprising converting, for each of two or more text elements in the document, the corresponding text element to a corresponding token from the plurality of tokens.

17. The computer storage media of claim 15, the operations comprising converting, for at least one of the one or more candidate anchors, the corresponding candidate anchor to an embedding representation, wherein determining the likelihood that the corresponding token is related to the corresponding candidate anchor uses the embedding representation of the corresponding candidate anchor.

18. The computer storage media of claim 15, the operations comprising:

receiving, from another system, second data that includes the context for the corresponding candidate anchor in the document; and providing, to the other system, the data for the document that indicates that the corresponding candidate anchor is an anchor for the temporal modifier.

19. A system comprising one or more computers and one or more storage devices on which are stored instructions that are operable, when executed by the one or more computers, to cause the one or more computers to perform operations comprising:

for each of one or more candidate anchors included in a plurality of tokens for a document, the plurality of tokens including a) at least one temporal modifier with a span, and b) at least one anchor i) for the temporal modifier and ii) that has a duration at least partially included in the span of the temporal modifier:

accessing a representation of a context for the corresponding candidate anchor in the document, comprising, for each of two or more tokens included in the context:

accessing an embedding representation for the corresponding token; and encoding, using the embedding representation, a vector for the corresponding token;

determining, for each of the two or more tokens included in the context for the corresponding candidate anchor and using the representation of the corresponding candidate anchor, a likelihood that the corresponding token is related to the corresponding candidate anchor; and determining, using the representation for the candidate anchor and the likelihoods that the tokens are related to the corresponding candidate anchor, whether a duration of the corresponding candidate anchor is likely included in the span of the temporal modifier; and in response to determining, for at least one candidate anchor from the one or more candidate anchors, that the duration of the corresponding candidate anchor is likely included in the span of the temporal modifier, storing, in memory, data for the document that indicates that the corresponding candidate anchor is an anchor for the temporal modifier.

* * * * *